Patented Jan. 1, 1952

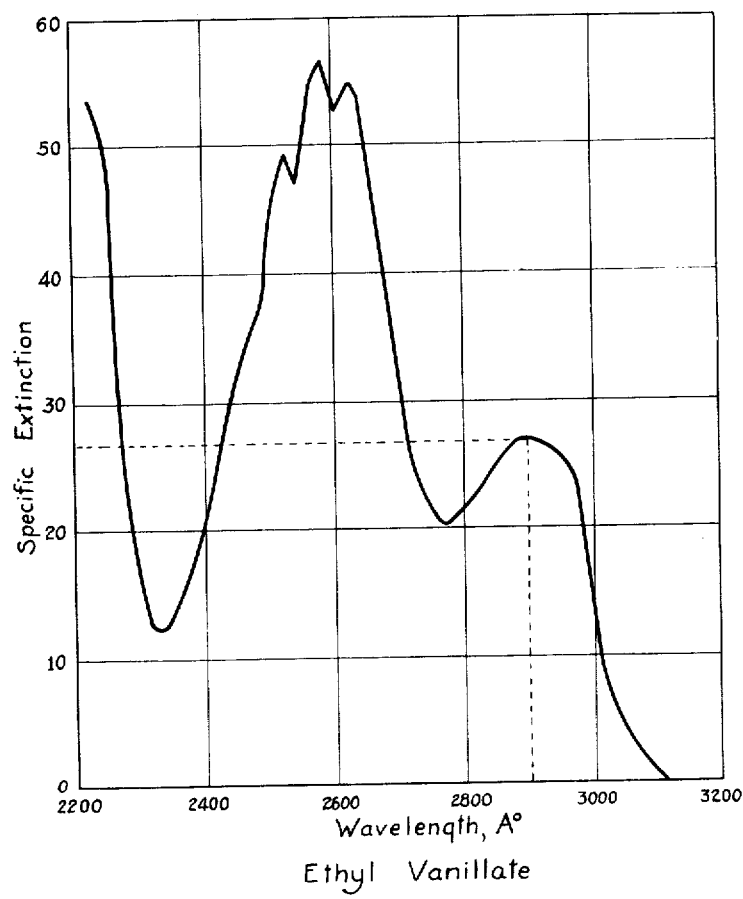
Ethyl Vanillate

2,580,461

UNITED STATES PATENT OFFICE 2,580,461

ULTRAVIOLET-RADIATION IMPERVIOUS WRAPPING MATERIAL

Irwin A. Pearl, Appleton, Wis., assignor, by mesne assignments, to Sulphite Products Corporation, Appleton, Wis., a corporation of Wisconsin Application August 27, 1947, Serial No. 770,895

12 Claims. (Cl. 117—121)

The present invention provides articles and products impervious to ultraviolet radiations having a wave length less than 3200 A. and in particular in the range of about 2400 to 3100 A.

Various means have been proposed for shielding organic products from the so-called "near ultraviolet," and in particular from ultraviolet radiation of the wave length of 3650 angstrom units (A.), and little or no attention has been devoted to the "far ultraviolet" or shorter waved radiations. However, organic products are deleteriously affected by "far ultraviolet" that is, radiations having wave lengths below about 3200 A. and especially in the approximate range of 2400 to 3100 A. Short wave ultraviolet is generated by electric discharge devices, as for example, by discharges in gases or vapors in such devices as fluorescent lamps. Although short wave ultraviolet may be excluded to a substantial extent by the container walls, even a very small component of transmitted short wave ultraviolet in time will do considerable harm. In sunlight the content of far ultraviolet falls off rapidly in wave lengths below 3200 A. due to the shielding of the atmosphere. However, long-continued impact of sunlight on products susceptible to chemical change by ultraviolet of wave length as short or shorter than 3100 A. will produce marked effects even though ultraviolet of longer wave lengths has been intercepted by filters. It has been found, for example, that newsprint paper containing ground wood pulp is rapidly depreciated by ultraviolet in the wave length range of about 2800 to 3100 A. Other organic products including food stuffs and especially products containing fats and oils are similarly affected. Butter is particularly vulnerable to depreciation by such short wave ultraviolet.

It is well established that sunburn results from exposure to natural sunlight when the ultraviolet energy in the spectral range is approximately 2900 to 3200 A. and more particularly 2967 A. It is not purely a hot weather phenomenon, but may occur in winter in high elevations in bright sun since the snow and ice will reflect the burning rays as intensely as water or sand. Furthermore, sunburn is more likely to occur at high altitudes because of the greater intensity of ultraviolet radiation. The erythema or reddening of the skin produced by the sun's rays is especially pronounced at the mountains and the seashore because the normal spectral composition of light is disturbed and actinic rays predominate over heat rays. Actinic rays facilitate the absorption of the irritating substances which the influence of light produces. Hausser and Vahle (Strahlentherapie 13, 41 (1921); 27, 348 (1928)) determined the relative degrees of erythema produced by the various mercury arc lines. They found a maximum sensitivity at 2970 A., the effect beginning at 3130 A. Wave lengths in the longer ultraviolet and visible had no effect. Wave lengths ranging from 3200 A. to 3650 A. will tan without burning. Compositions which filter out the burning radiations and still permit tanning without burning, are of the type particularly desired for use in sun burn preparations.

Hirschkind, Pye and Thompson (Paper Trade Journal 105, 118–119 (1937)) have demonstrated that only ultraviolet rays shorter than 3000 A. degrade cellulose. Montana (Holz Roh-u Werkstoff, 1, 438 (1937–1938)) confirmed this finding. The short ultraviolet rays have also been found to degrade cellulose esters and derivative films and sheets in addition to the parent cellulose. (See Heuser, "Cellulose Chemistry," John Wiley, New York, 1944, pages 481 ff. Also Tichenor, J. Polymer Sci. 1, 217 (1946); Lawton and Nason, Ind. Eng. Chem. 36, 1128 (1944); and Meyer and Gearhart, Ind. Eng. Chem. 37, 232 (1945).)

I have discovered that esters of benzoic acid in which the phenyl ring is substituted in the 3-position by a methoxy group and the 4-position by a hydroxy group have a marked extinguishing or screening effect on ultraviolet radiations of the above-discussed short wave length range. I have also discovered that the esters of 3-methoxy-4-hydroxy-benzoic acid are compatible with the film-forming compositions of various types and due to their substantial freedom from toxic effects, that they are particularly well suited for use with foods, cosmetic preparations and the like.

My present invention comprises the combination, or association of products susceptible to ultraviolet shorter than 3200 Å. with esters of benzoic acid characterized by the presence of the 3-methoxy-4-hydroxy grouping. In many instances the esters are extended in bases such as plastic resin films and the like, as well as cosmetic bases, etc. In other instances a product from which short wave length ultraviolet is to be excluded is admixed, coated, or otherwise directly associated with the ester. Wood pulp which is deleteriously affected by ultraviolet may in accordance with my invention be associated with the ester in the course of its manufacture into paper.

In the accompanying drawing is shown a representative graph of ultraviolet specific extinction constants over a range of wave lengths of about 2200 to 3200 Å. for ethyl 3-methoxy-4-hydroxy-benzoate.

In accordance with one embodiment of my invention sheet or film material which is to be made opaque to ultraviolet having a wave length in the range of approximately 2400 to 3100 Å. has an ester of vanillic acid (3-methoxy-4-hydroxy-benzoic acid) dispersed therein, or is suitably coated with such ester. Ordinarily such sheet or film material embodying my invention should be chosen to transmit light in the visible range (above 4000 Å.) and may, or may not, as desired, be made opaque to ultraviolet of longer wave lengths. If ultraviolet of longer wave length is to be excluded, the sheet material is associated with one or more supplemental excluding agents, as, for example, esters of orthovanillic acid, which are described in a copending application Serial No. 781,166, filed October 21, 1947, now Patent No. 2,568,760.

The 3-methoxy-4-hydroxy benzoic acid esters have a germicidal action and hence will function also to exert a preservative effect on film or sheet material which is subject to biologic or other disintegrating effects. For example, cellulosic products, such as cellulose acetate and nitrocellulose, are subject to fungus growths in tropical climates. Hence, sheet materials made of such products are benefited by the incorporation therein of the esters of the present invention.

Another advantageous characteristic of the 3-methoxy-4-hydroxy-benzoates is their plasticizing effect on products subject to embrittlement, including films as well as detached sheets. The esters in accordance with my invention are associated with such products with or without other plasticizing agents.

My present invention is particularly applicable to transparent sheet products employed in wrapping or otherwise packaging organic products, including food products. Transparent sheet products include cellulosic material such as paper (including parchment and glassine paper), sheet products consisting of regenerated cellulose (cellophane), esters and ethers of cellulose, sheet products consisting of resins, for example, the methacrylate and vinylite compounds, polystyrene, alkyd resins and others.

The 3-methoxy-4-hydroxy-benzoic acid esters are either wholly without odor, or possess slight pleasant odors. For wrapping products such as butter or other fats, in such sheet products, as parchment paper, substantially odorless additions of esters are advantageous.

The content of the esters in sheet or film products or other materials will vary widely with the functions desired, that is, whether only an ultraviolet excluding effect is desired, or whether also preservative and plasticizing effects are desired.

If only an ultraviolet screening effect for a given wave length is desired, the required content of ester may be calculated from the formula which defines the specific extinction, $k$.

Specific extinction $k = \frac{1}{cd} \log_{10} \frac{I_0}{I}$

In this formula $I_0$ is the intensity of the incident light; $I$ is the intensity of transmitted light; $c$ is the concentration of ester in parts per thousand; $d$ is the length of the light path in centimeters (i. e. thickness of the base or sheet material).

Should this formula be used for determining the amount of ethyl vanillate required to cause a 0.002" thick cellulose nitrate film to transmit only 1% of incident ultraviolet of wave length of 2900 Å. the formula may be used in conjunction with a specific extinction curve such as shown in the drawing. In this curve ordinates are plotted in angstrom units of wave length and abscissae are plotted in specific extinction units.

$$\frac{I_0}{I} = \frac{100}{1} \text{ or } \log_{10} \frac{I_0}{I} = 2$$

$d = 0.002"$ or 0.005 cm.

As indicated by the curve $k = 27$

Substituting in the equation $$27 = \frac{1}{(0.005c)} \quad (2)$$

Transposing $$c = \frac{2}{27 \times 0.005} = 15. \text{ parts per thousand or } 1.5\%$$

This calculation indicates that a film of nitrocellulose 0.002" in thickness containing 1.5% of ethyl vanillate will transmit only 1% of incident light of wave length 2900 Å. Extinction of ultraviolet for other conditions, as for example, films of greater thickness or different extinguishing effect may be similarly calculated.

In the production of sheet material embodying my invention the esters may be introduced by direct solution, or by solution in a solvent which is suitable for addition to the sheet material, as, for example, in a plasticizer consisting of a high boiling ester.

The following examples are to be considered as illustrative and not as limiting.

EXAMPLE I

A lacquer for moistureproofing regenerated cellulose (cellophane) sheets is prepared from the following ingredients in which the "parts" represent parts by weight.

| | Parts |
|---|---|
| Nitrocellulose | 6.70 |
| Paraffin wax | 0.15 |
| Dammar | 1.50 |
| Dibutylphthalate | 2.90 |
| Acetone | 1.45 |
| Ethanol | 2.90 |
| Toluene | 33.10 |
| Ethyl acetate | 51.00 |
| Water | 0.30 |
| Ethyl vanillate | 0.013 |

The ethyl vanillate is mixed with the dibutylphthalate and compounded into the lacquer in accordance with standard practices, such, for example, as described in Patent 2,280,829. This lacquer contains about 1.48% ethyl vanillate (based on the non-volatile constituents), and a film 0.002 inch thick will transmit only 1% incident light for a wavelength of 2900 Å. This may be ascertained by use of the formula as explained above.

EXAMPLE II

A composition for preventing sunburn is prepared by mixing about 1 to 2 parts of ethyl vanillate with a vanishing cream base. Oily bases such as mineral oil, vegetable oil, etc., may also be employed in place of the vanishing cream if desired.

EXAMPLE III

Parchment paper made in accordance with standard practices is treated with a warm aquebus emulsion or dispersion containing about 3% to 5% ethyl vanillate. Preferably, the paper is treated while still wet and then subjected to the usual drying operation.

The esters of the 3-methoxy-4-hydroxy benzoic acid used in the compositions of the present invention may be made by various esterification processes. The following are illustrative examples.

TABLE I

| Vanillic Acid Ester | Melting Point (M. P.) or Boiling Point (B. P.) ° C. |
|---|---|
| Methyl | M. P. 62–63 |
| Ethyl | M. P. 43–44 |
| Propyl | M. P. 42–43 |
| Isopropyl | M. P. 112–113 |
| Butyl | M. P. 48–49 |
| Isobutyl | M. P. 56–57 |
| Secondary butyl | M. P. 73–74 |
| Tertiary butyl | M. P. 79–80 |
| Amyl | M. P. 35–36 |
| Isoamyl | M. P. 61–62 |
| Secondary butylcarbinyl | B. P. 119–121/2 mm. |
| Diethyl carbinyl | B. P. 112–114/2 mm. |
| Hexyl | B. P. 129–130/2 mm. |
| 2-ethyl butyl | M. P. 42 |
| Benzyl | M. P. 34–35 |
| Phenyl | M. P. 93–94 |
| Guaiacyl | M. P. 86–87 |

The methyl, ethyl, propyl, isopropyl, butyl, isobutyl, secondary butyl, amyl, isoamyl, secondary butyl carbinyl, diethyl carbinyl, hexyl, benzyl, and phenyl esters may be prepared in accordance with the processes described in my co-pending application Serial No. 597,145, filed June 1, 1945, now abandoned. A general method for making alkyl esters may be illustrated by the following additional example.

*2-ethylbutyl vanillate*

A mixture of about 100 grams of vanillic acid and 400 cc. of 2-ethylbutyl alcohol is heated on a steam bath for about 4 hours while being saturated with dry hydrogen chloride gas. Most of the excess 2-ethylbutyl alcohol is next removed by distillation under reduced pressure and the viscous residue extracted with ether. The ether solution is washed with saturated sodium bicarbonate solution, then with water, and finally dried over anhydrous sodium sulfate and distilled. The residual oil is then distilled under high vacuum and the desired 2-ethylbutyl vanillate recovered as a colorless oily liquid boiling between 166° C./1 mm. and 179° C./3 mm. Strong cooling causes the oil to solidify to a white crystalline solid melting at about 37°–38° C. Recrystallization from petroleum ether (65°–110° C.) raised the melting point to 42° C.

The above process employing dry HCl gas as well as the alternative process described in my above mentioned copending application employing sulfuric acid with the proper esterifying alcohol, may be used to prepare various alkyl esters of the present invention. These processes, however, are not satisfactory for use in preparing the tertiary butyl ester as tertiary butyl alcohol is converted to isobutylene in the presence of acids or other dehydrating agents. The tertiary butyl ester may be prepared by the processes given below.

*Tertiary butyl vanillate*

METHOD A

A mixture of about 30 grams of carbomethoxyvanillic acid (prepared by reacting vanillic acid with methyl chlorocarbonate) and 75 cc. of thionyl chloride is heated to boiling under reflux for about 45 minutes and the excess thionyl chloride removed under reduced pressure on a steam bath. The residue of carbomethoxyvanilloylchloride is dissolved in 300 cc. of dry ether and treated with 11.0 grams of tertiary butyl alcohol and 40 cc. of pyridine, and the resulting mixture heated to boiling under reflux for one hour. The solvent is next distilled under reduced pressure from a steam bath, and the residue stirred into a mixture of dilute hydrochloric acid and ice. The resinous solid which separates is recrystallized from ethanol to yield impure tertiary butyl carbomethoxyvanillate as a white powder melting at 172°–174° C. This material is not purified further, but is used as such for preparing the desired tertiary butyl vanillate.

A solution of 15 grams of tertiary butyl carbomethoxyvanillate obtained as above, in 150 cc. of acetone is treated with 75 cc. of N sodium hydroxide at room temperature and allowed to stand at room temperature for 2 hours. The solution is next diluted with one liter of water and the resulting clear solution acidified with hydrochloric acid. The white fluffy precipitate which separates is filtered and dried giving a hard crystalline mass of tertiary butyl vanillate melting at 79°–90° C. Recrystallization from ligroin does not change the melting point.

METHOD B

A mixture of about 25.8 grams of vanillic acid, 15 grams of potassium bicarbonate and 25 cc. of water is evaporated to dryness under reduced pressure on a water bath. The resulting potassium vanillate powder is next covered with 50 cc. of tertiary butyl chloride and 100 cc. of tertiary butyl alcohol and the mixture boiled under reflux for about 5 hours. The alcohol and alkyl chloride are removed by distillation under reduced pressure and the residue taken up in water and ether. The ether is then separated, thoroughly washed with saturated sodium bicarbonate solution, dried, and distilled to leave a residual viscous oil which solidifies on cooling. Recrystallization from ligroin gives white crystals of tertiary butyl vanillate melting at 78°–80° C.

This process may be employed to prepare various alkyl esters as well as the aralkyl esters by reacting the alkyl or aralkyl halide with the alkali metal vanillate. The benzyl ester described in my above mentioned co-pending application is prepared, for example, by reacting potassium vanillate with benzyl chloride.

The aryl esters may be prepared by two illustrative methods described below.

*Guaiacyl vanillate*

METHOD C

Carbethoxyvanilloyl chloride (prepared from 24 grams of carbethoxyvanillic acid and thionyl chloride as described above for carbomethoxyvanilloyl chloride in Method A) is dissolved in 250 cc. of ether and treated with a solution of 13.6 grams of guaiacol in 110 cc. of N sodium hydroxide. The mixture is alternately cooled and shaken for one hour and placed in a refrigerator overnight. The clear ether layer is separated, washed with water, and dried. The ether is next removed below 30° C. under reduced pressure. The residue is cooled, stirred with 10% sodium carbonate solution, washed with water, dissolved in boiling acetone and filtered. The cooled acetone filtrate is diluted with water and the crystalline mass which separates recrystallized from petroleum ether to give pure guaiacyl carbethoxyvanillate as fine white needles melting at 93°–94° C. Hydrolysis of this product with N sodium hydroxide at room temperature yields a viscous oil which is recrystallized from ligroin to yield guaiacyl vanillate as white crystals melting at 86°–87° C.

METHOD D

A mixture of about 84 grams of finely powdered vanillic acid and 62 grams of guaiacol is heated to about 135° C. and treated dropwise with 28 grams of phosphorus oxychloride. A vigorous reaction takes place and the dark mixture is removed from the heat. After the temperature has dropped to 80° C., the mixture is gradually warmed to 150° C. and allowed to cool. At this point all of the hydrogen chloride evolution ceases and the mixture solidifies. The cooled reaction mixture is next dissolved in boiling ethanol, filtered, the filtrate diluted with water, and extracted with ether. The ether is first washed with sodium bicarbonate solution, then with water, dried and distilled. The residue is fractionally distilled in high vacuum to obtain the desired guaiacyl vanillate as a viscous, almost colorless, oil boiling at 199°–200° C./2 mm. which solidifies to crystals melting at 86–87° C.

This process may be employed to prepare various aryl esters by reacting the phenolic compound with vanillic acid in a phosphorus oxychloride reaction mixture. The phenyl ester described in my above mentioned co-pending application is prepared, for example, by reacting phenol with vanillic acid in a phosphorus oxychloride reaction mixture.

SUBSTITUTED VANILLATE ESTERS 5-methoxy vanillates

These esters may be prepared by reacting a 5-methoxy vanillic acid (syringic acid) with the esterifying alcohol in a sulfuric acid reaction mixture. The following examples are illustrative.

TABLE II

| Syringic acid ester: | Melting point, °C. |
|---|---|
| Ethyl | 85–86 |
| Propyl | 62–63 |
| Isopropyl | 84–85 |
| Butyl | 66–67 |
| Isobutyl | 67–68 |
| Secondary butyl | 50–51 |

The propyl, isopropyl, butyl, isobutyl and secondary butyl esters may be prepared in accordance with the processes described in my co-pending application Serial No. 676,573, filed June 13, 1946, now abandoned. The general method for making these esters may be illustrated by the following additional example.

Ethyl syringate

A mixture of about 25 grams of syringic acid (5-methoxy-vanillic acid), 150 cc. of ethanol and 6 cc. of concentrated sulfuric acid is heated under reflux for about 3 hours and then concentrated to a small volume by distilling on a steam bath under reduced pressure. The colorless residue is stirred with 500 cc. of cold water and the mixture neutralized with a slurry of sodium bicarbonate. The white crystalline precipitate which separates is filtered, washed with water, and dried to yield ethyl syringate as white cubic crystals melting at 85°–86° C. Recrystallization from petroleum ether yields white crystalline cubes of the same melting point.

5-chloro vanillates

These esters may be prepared by reacting a 5-chloro-vanillic acid with the esterifying alcohol in a sulfuric acid reaction mixture. The following examples are illustrative.

Methyl 5-chlorovanillate

A mixture of about 50 grams of 5-chlorovanillic acid, 250 cc. of methanol and 12.5 cc. of concentrated sulfuric acid is heated to boiling under reflux for about 3 hours and concentrated to a small volume under reduced pressure. The residue is diluted with one liter of cold water and neutralized with a slurry of sodium bicarbonate. The precipitate is then filtered, washed and dried and yields methyl 5-chlorovanillate as white crystals melting at 135°–136° C.

Ethyl 5-chlorovanillate

This ester is prepared in the same manner as the corresponding methyl ester described above by substituting ethanol for methanol. The desired ethyl ester is obtained as long needles melting at 119°–120° C.

Propyl 5-chlorovanillate

This ester is prepared in the same manner as the corresponding methyl ester described above by substituting propanol for methanol. The desired propyl ester is obtained as flat needles melting at 118°–119° C.

Butyl 5-chlorovanillate

This ester is prepared in the same manner as the corresponding methyl ester described above by substituting butanol for methanol. The desired butyl ester is obtained as translucent platelets melting at 109°–110° C.

CHLORO-ALKYL ESTERS

These esters may be prepared by reacting a vanillic acid with a chlorohydrin in a sulfuric acid reaction mixture or by reacting a vanillic acid with a polyhydric alcohol while saturating the reaction mixture with gaseous hydrogen chloride. The following examples will serve for illustrative purposes.

2-chloroethyl vanillate

METHOD E

A mixture of 100 grams of vanillic acid, 600 grams of ethylene chlorohydrin and 25 cc. of sulfuric acid is heated to boiling under reflux for 2 hours and then most of the solvent is removed by distillation under reduced pressure. The residue is stirred into 3 liters of cracked ice and water and neutralized with a slurry of sodium bicarbonate. The solid mass which separates is extracted with ether, washed with water, dried, and distilled on a steam bath leaving a very viscous black liquid. This liquid is distilled under vacuum and gives a viscous colorless oil boiling at 161° C./3 mm. Cooling and scratching causes the oil to crystallize which upon recrystallization from ligroin gives transparent iridescent platelets of 2-chloroethyl vanillate melting at about 57°–58° C.

METHOD F

A mixture of 100 grams of vanillic acid and 500 cc. of ethylene glycol is heated for about 4 hours on a steam bath while being saturated with hydrogen chloride gas. The excess ethylene glycol is removed and the residue extracted with 1500 cc. of ether. The ether solution is neutralized with sodium bicarbonate solution, washed with water and dried in accordance with standard practices, e. g. over anhydrous sodium sulfate. The dried ether solution is then distilled to remove the ether and the residue distilled under high vacuum to yield 2-chloroethyl vanillate as a colorless viscous oil which solidifies to a white crystalline solid melting at about 58° C.

2-chloropropyl vanillate

This ester is prepared by Method F above by saturating with hydrogen chloride a reaction mixture containing 400 cc. of propylene glycol and 100 grams of vanillic acid. The colorless oil initially obtained boils at 162° C./2 mm. to 170° C./3 mm. Upon stirring the oil solidifies to a white crystalline solid which upon recrystallization from petroleum ether (60°–110°) yields the desired ester as white crystals melting at 49° C.

3-chloropropyl vanillate

This ester is prepared by Method F above by saturating with hydrogen chloride a reaction mixture containing 500 cc. of trimethylene glycol and 100 grams of vanillic acid. The viscous oil initially obtained boils at 192°–204° C./4 mm. Upon stirring, the oil solidifies to a white solid which, upon recrystallization from petroleum ether, yields the desired ester as white crystals melting at 67–68° C.

2,3-dichloropropyl vanillate

This ester is prepared by reacting 100 grams of vanillic acid with 500 cc. of glycerol over a steam bath for about 6 hours with continuous introduction of hydrogen chloride. The acid mixture is cooled, diluted with one liter of water, neutralized with a slurry of sodium bicarbonate and extracted with ether. The ether extract is then dried over sodium sulfate, the ether removed by distillation on a steam bath, and the residue distilled under high vacuum. The glycerol distills at 103° C./3.5 mm. and the 2,3-dichloropropyl vanillate is recovered as a colorless viscous oil boiling at 204° C./3.5 mm. This oil is then boiled with petroleum ether, filtered and upon cooling crystals of the desired ester are obtained melting at 42°–43° C.

2-chloro-1-chloromethylethyl vanillate

This ester is prepared by Method E above by reacting vanillic acid with 1,3-glycerol dichlorohydrin. The desired 2-chloro-1-chloromethylethyl ester is obtained as a viscous oil with a refractive index of $n_D^{24}$ 1.5513 and a boiling point of 190° C./2 mm. This process may also be employed to prepare the 2,3-dichloropropyl ester described above by reacting vanillic acid with 2,3-glycerol dichlorohydrin in accordance with Method E.

POLYHYDRIC ALCOHOL ESTERS

These esters may be prepared by reacting a potassium vanillate with a chlorohydrin or by reacting a vanilloyl chloride with a polyhydric alcohol. The following examples will serve for illustrative purposes.

Ethylene glycol monovanillate

A mixture of 100 grams of vanillic acid, 60 grams of potassium bicarbonate and 100 cc. of water is evaporated to dryness under reduced pressure on a water bath. When dry, the potassium vanillate is ground to a fine powder, covered with 250 cc. of ethylene chlorohydrin, and boiled under reflux for 8 hours with frequent shaking. The excess chlorohydrin is removed at atmospheric pressure and the residue poured into cold water with stirring. The mixture is extracted with ether, and the ether dried and distilled. The oily residue is then distilled under reduced pressure giving ethylene glycol monovanillate as a viscous colorless oil boiling at 198° C./2 mm. which solidifies upon stirring. Recrystallization of the solid from chloroform gives white crystals melting at 85°–86° C.

Ethylene glycol divanillate

A mixture of 60 grams of carbethoxyvanillic acid and 150 cc. of thionyl chloride is heated to boiling under reflux for 45 minutes. The excess thionyl chloride is removed by distillation under reduced pressure, and the residual carbethoxyvanilloyl chloride dissolved in 600 cc. of dry ether. The ether solution is treated with 16 grams of ethylene glycol and 80 cc. of pyridine and the mixture refluxed for 2 hours. The ether and excess pyridine are removed by distillation under reduced pressure, and the residue stirred into a mixture of ice and dilute hydrochloric acid. The gummy mass which separates is recrystallized from petroleum ether to give white crystals of ethylene glycol dicarbethoxyvanillate melting at 139° C. This product is next treated with an excess of 3 N ammonium hydroxide and allowed to stand at room temperature for 24 hours with occasional shaking. The solution is filtered, the filtrate acidified with dilute hydrochloric acid, and the white precipitate which forms filtered, washed with water and dried. The crude product thus obtained is recrystallized from dilute ethanol and gives pure ethylene glycol divanillate as white crystals melting at 144° C.

Propylene glycol monovanillate

This ester is prepared in the same manner as the ethylene glycol monovanillate described above by condensing potassium vanillate with propylene chlorohydrin. The desired propylene glycol monovanillate is obtained as a viscous oil boiling at 175° C./1 mm.

CELLOSOLVE AND CARBITOL ESTERS

These esters which possess an ether (carbon-oxygen-carbon) linkage in the ester group, have been found to be particularly compatible with various types of film forming materials as well as to possess desired plasticizing effects. The following examples will serve to illustrate the preparation of these alkoxyalkyl and aryloxyalkyl esters.

Methyl Cellosolve vanillate

A mixture of 100 grams of vanillic acid, 500 cc. of ethylene glycol monomethyl ether and 20 cc. of sulfuric acid is boiled under reflux for about 6 hours and most of the excess ethylene glycol monomethyl ether then removed by distillation under reduced pressure. The dark red viscous residue is taken up in ether, washed well with saturated sodium bicarbonate solution and then with water and dried with anhydrous sodium sulfate. The ether is next removed on a steam bath and the residue distilled in a vacuum. The desired 2-methoxyethyl vanillate ester distills as a colorless oily liquid boiling at 160° C./4 mm. to 173° C./4.5 mm. Stirring of the oil causes it to solidify to white crystals, which, upon recrystallization from petroleum ether, melt at 39° C.

Cellosolve vanillate

This ester is prepared in accordance with the above methyl Cellosolve ester process by reacting 100 grams of vanillic acid with 600 cc. of Cellosolve in a sulfuric acid reaction mixture. The oil initially obtained boils at 142° C./3 mm. to 146° C./3.5 mm. This oil is vigorously stirred with a little water and with the liberation of a little heat it solidifies to a crystalline mass as the monohydrate of the desired 2-ethoxyethyl vanillate ester. The crystals, upon recrystallization from petroleum ether melt at 47°–48° C. This product possesses the odor of maple sugar.

Butyl Cellosolve vanillate

This ester is prepared in accordance with the above methyl Cellosolve ester process by reacting vanillic acid with butyl cellosolve in the presence of sulfuric acid. The desired 2-butoxyethyl vanillate ester is obtained as a colorless oil boiling at 176° C./4 mm. to 186° C./7 mm. and has a refractive index of $n_D^{21.8}$ 1.5099.

2-ethylbutyl Cellosolve vanillate

A suspension of 100 grams of vanillic acid in 500 cc. of 2-ethylbutyl Cellosolve is heated for about 5 hours on a steam bath while being saturated with hydrogen chloride gas. From the resulting dark violet solution approximately 300 cc. of excess 2-ethylbutyl cellosolve is removed by distillation under reduced pressure and the dark viscous residue obtained then cooled and extracted with ether. The ether solution is next washed with saturated sodium bicarbonate solution, then with water and finally dried and distilled. After removal of the ether, the residue is distilled under high vacuum and yields a colorless, odorless oil boiling between 190° C./5 mm. and 214° C./6.5 mm. Redistillation of this oil gives the desired pure 2-(2-ethylbutoxy) ethyl vanillate ester boiling at 200° C./3 mm. with a refractive index $n_D^{24}$ 1.5161.

Phenyl Cellosolve vanillate

This ester is prepared in accordance with the above 2-ethylbutyl Cellosolve ester process by heating a suspension of 100 grams of vanillic acid in 500 cc. of phenyl Cellosolve on a steam bath for 5 hours while saturating the reaction mixture with dry hydrogen chloride. After removal of the excess phenyl Cellosolve the solid which separates in the concentrated solution is separated by filtration and then washed with ether. This product melts at about 109°–110° C. Concentration and filtration is continued until about 138 grams of product is obtained. Recrystallization of this solid from petroleum ether yields the desired pure 2-phenoxyethyl vanillate as fluffy white needles melting sharply at 113° C.

Methyl Carbitol vanillate

This ester prepared in accordance with the above 2-ethylbutyl Cellosolve ester process by reacting vanillic acid with methyl Carbitol, is obtained as a colorless liquid having a refractive index $n_D^{23}$ 1.5398. The desired 2-(2-methoxyethoxy) ethyl vanillate ester boils at 216°–219° C./3 mm.

Carbitol vanillate

This ester prepared in accordance with the above 2-ethylbutyl Cellosolve ester process by reacting vanillic acid with Carbitol, is first obtained as a colorless viscous liquid boiling at 209° C./3 mm. Upon cooling this liquid in the refrigerator the desired 2-(2-ethoxy-ethoxy) ethyl vanillate ester is obtained as a waxy solid melting at 28° C.

Investigations have demonstrated that the important group in the compounds used in the present invention resides in the presence or combination of adjacent methoxy and hydroxy groups, and specifically a methoxy group and a hydroxy group at the 3- and 4-positions, respectively, to the COO-group on the phenyl ring. Investigations have also demonstrated that the replacement of the H atom of the acid or carboxyl (COOH) group of the 3-methoxy-4-hydroxybenzoic acid with an ester group results in no substantial change in the extinguishing or screening effect on ultraviolet radiations. The ester is employed in the present invention as the presence of the organic ester group makes the compounds more compatible with various bases, e. g. resins and the like, as well as substantially chemically inert under the conditions of use. The esters are also employed as they are stable to heat and resistant to micro-organisms, and are odorless or have pleasant odors. Other reasons for employing the esters are that investigations have demonstrated esters of 3-methoxy-4-hydroxy-benzoic acid to have inherent plasticizing effects which help keep flexible films flexible, that the esters remain with the film forming compositions due to their high boiling points (i. e. extremely low vapor pressures), and that esters do not cause transparent films to discolor or haze. In addition to the above, as the esters are substantially non-toxic to animals including humans, they are particularly adaptable for use in the various fields of the ultraviolet radiation art.

I claim:

1. A wrapping material substantially impervious to ultraviolet radiations in the range of about 2400 to 3100 Å., comprising a base sheet normally pervious to ultraviolet radiations having incorporated therewith a sufficient amount of an ester of 3-methoxy-4-hydroxy-benzoic acid to render said base sheet impervious to ultraviolet radiations in said range.

2. A wrapping material substantially impervious to ultraviolet radiations in the range of about 2400 to 3100 Å., comprising a resin base normally pervious to ultraviolet radiations having a coating thereon containing as an essential ingredient, a sufficient amount of an ester of 3-methoxy-4-hydroxy-benzoic acid to render said resin base impervious to ultraviolet radiations in said range.

3. A wrapping material substantially impervious to ultraviolet radiations in the range of about 2400 to 3100 Å., comprising a cellophane base sheet normally pervious to ultraviolet radiations coated with a water-proofing composition containing a sufficient amount of an ester of 3-methoxy-4-hydroxy-benzoic acid to render said base sheet impervious to ultraviolet radiations in said range.

4. A wrapping material as set forth in claim 1 characterized in that said base sheet is a cellulose material.

5. A wrapping material as set forth in claim 1 characterized in that said base sheet is a paper base containing groundwood.

6. A wrapping material as set forth in claim 4 characterized in that said ester is an alkyl ester of vanillic acid.

7. A wrapping material as set forth in claim 4 characterized in that said ester is ethyl vanillate.

8. A wrapping material as set forth in claim 1 characterized in that said base sheet is a resin material.

9. A wrapping material as set forth in claim 8 characterized in that said ester is an ester of vanillic acid.

10. A wrapping material as set forth in claim 8 characterized in that said ester is ethyl vanillate.

11. A wrapping material as set forth in claim 8 characterized in that said ester is a Cellosolve ester of vanillic acid.

12. A wrapping material as set forth in claim 8 characterized in that said ester is a Carbitol ester of vanillic acid.

IRWIN A. PEARL.

REFERENCES CITED

The following references are of record in the file of this patent:

UNITED STATES PATENTS

| Number | Name | Date |
|---|---|---|
| 1,920,483 | Senftner | Aug. 1, 1933 |
| 2,267,200 | Hershberger et al. | Dec. 23, 1941 |
| 2,375,138 | Salvin et al. | May 1, 1945 |
| 2,380,043 | Hochwalt | July 10, 1945 |
| 2,383,074 | Parker | Aug. 21, 1945 |
| 2,418,695 | Brown | Apr. 8, 1947 |

FOREIGN PATENTS

| Number | Country | Date |
|---|---|---|
| 474,666 | Great Britain | Nov. 1, 1937 |

OTHER REFERENCES

Goodman: Cosmetic Dermatology (1936), p. 525.

Food Industries, vol. 17 (1945), pp. 1173–1458–61, 1600, 1602, 1604.

Pearl: Chem. Abstracts, vol. 40, p. 1945 (Apr. 1946).

Certificate of Correction

Patent No. 2,580,461                                             January 1, 1952

IRWIN A. PEARL

It is hereby certified that error appears in the printed specification of the above numbered patent requiring correction as follows:

Column 6, line 27, for "79°–90° C." read *79°–80° C.*;

and that the said Letters Patent should be read as corrected above, so that the same may conform to the record of the case in the Patent Office.

Signed and sealed this 15th day of April, A. D. 1952.

[SEAL]

THOMAS F. MURPHY,
*Assistant Commissioner of Patents.*